(12) United States Patent
Cadigan, Jr. et al.

(10) Patent No.: US 9,158,698 B2
(45) Date of Patent: Oct. 13, 2015

(54) DYNAMICALLY REMOVING ENTRIES FROM AN EXECUTING QUEUE

(71) Applicant: International Business Machines Corporation, Armonk, NY (US)

(72) Inventors: Michael J. Cadigan, Jr., Poughkeepsie, NY (US); Scot H. Rider, Pleasant Valley, NY (US); Donald W. Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 13/832,725

(22) Filed: Mar. 15, 2013

(65) Prior Publication Data

US 2014/0281253 A1    Sep. 18, 2014

(51) Int. Cl.
*G06F 12/02* (2006.01)
*G06F 12/08* (2006.01)
*G06F 9/30* (2006.01)
*G06F 3/06* (2006.01)

(52) U.S. Cl.
CPC .......... *G06F 12/0891* (2013.01); *G06F 3/0656* (2013.01); *G06F 9/30043* (2013.01); *G06F 9/30047* (2013.01)

(58) Field of Classification Search
CPC .............. G06F 3/0656; G06F 9/30043; G06F 9/30047; G06F 12/0891
See application file for complete search history.

(56) References Cited

U.S. PATENT DOCUMENTS

| | | | |
|---|---|---|---|
| 5,706,467 A * | 1/1998 | Vishlitzky et al. | 711/129 |
| 6,671,875 B1 * | 12/2003 | Lindsey et al. | 717/129 |
| 7,024,523 B1 * | 4/2006 | Young | 711/154 |
| 7,392,366 B2 | 6/2008 | Bose et al. | |
| 8,037,474 B2 | 10/2011 | Bates et al. | |
| 8,387,057 B2 | 2/2013 | Wilmarth | |
| 2008/0249641 A1 * | 10/2008 | Enver et al. | 700/9 |
| 2011/0078697 A1 | 3/2011 | Smittle et al. | |
| 2012/0131309 A1 | 5/2012 | Johnson et al. | |
| 2012/0246651 A1 | 9/2012 | Li et al. | |
| 2012/0304198 A1 | 11/2012 | Bakke et al. | |
| 2013/0054871 A1 | 2/2013 | Lassa | |

* cited by examiner

*Primary Examiner* — Hiep Nguyen
(74) *Attorney, Agent, or Firm* — Cantor Colburn LLP; Steven Chiu (57) ABSTRACT

According to an embodiment, a computer-implemented method for control block management is provided. The computer-implemented method includes placing one or more control blocks in a queue for execution by a computer hardware device. The computer-implemented method also includes allocating a purge flag in each of the control blocks. The purge flag instructs the computer hardware device to skip execution of the corresponding control block.

20 Claims, 10 Drawing Sheets

DYNAMICALLY REMOVING ENTRIES FROM AN EXECUTING QUEUE

BACKGROUND

The present invention relates to control block management and, more specifically, to systems and methods for removing control blocks from a queue while the queue is being executed.

Typical input/output (I/O) devices are queue-based, passing control blocks and ownership through memory. In some cases, to stop work from being performed, execution of a control block may need to be prevented after the control block has been added to a queue. Generally, this requires taking the entire queue offline, which delays processing of control blocks that are not being removed from the queue. In high performance systems with virtualization and prefetching capabilities, the complexity of removing entries from a queue can become challenging, particularly while the queue is running.

SUMMARY

According to an embodiment, a computer-implemented method for control block management is provided. The computer-implemented method includes placing one or more control blocks in a queue for execution by a computer hardware device. The computer-implemented method also includes allocating a purge flag in each of the control blocks. The purge flag instructs the computer hardware device to skip execution of the corresponding control block.

In another embodiment, a system includes a queue, a first control block, and a computer processor. The queue includes one or more control blocks for execution by a computer hardware device. The first control block is located in the queue. The computer processor is communicatively coupled to the queue and is configured to allocate a purge flag in the first control block, where the purge flag is configured to instruct a computer hardware device to skip execution of the first control block.

In yet another embodiment, a computer program product includes a computer readable storage medium having program code embodied therewith. The program code is executable by a processor to perform a method. The method includes placing one or more control blocks in a queue for execution by a computer hardware device. Also according to the method, a purge flag is allocated in each of the control blocks. The purge flag instructs the computer hardware device to skip execution of the corresponding control block.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments are directed to control block management to enable control blocks to be removed from a queue without the queue having to be taken offline.

Figure 1:
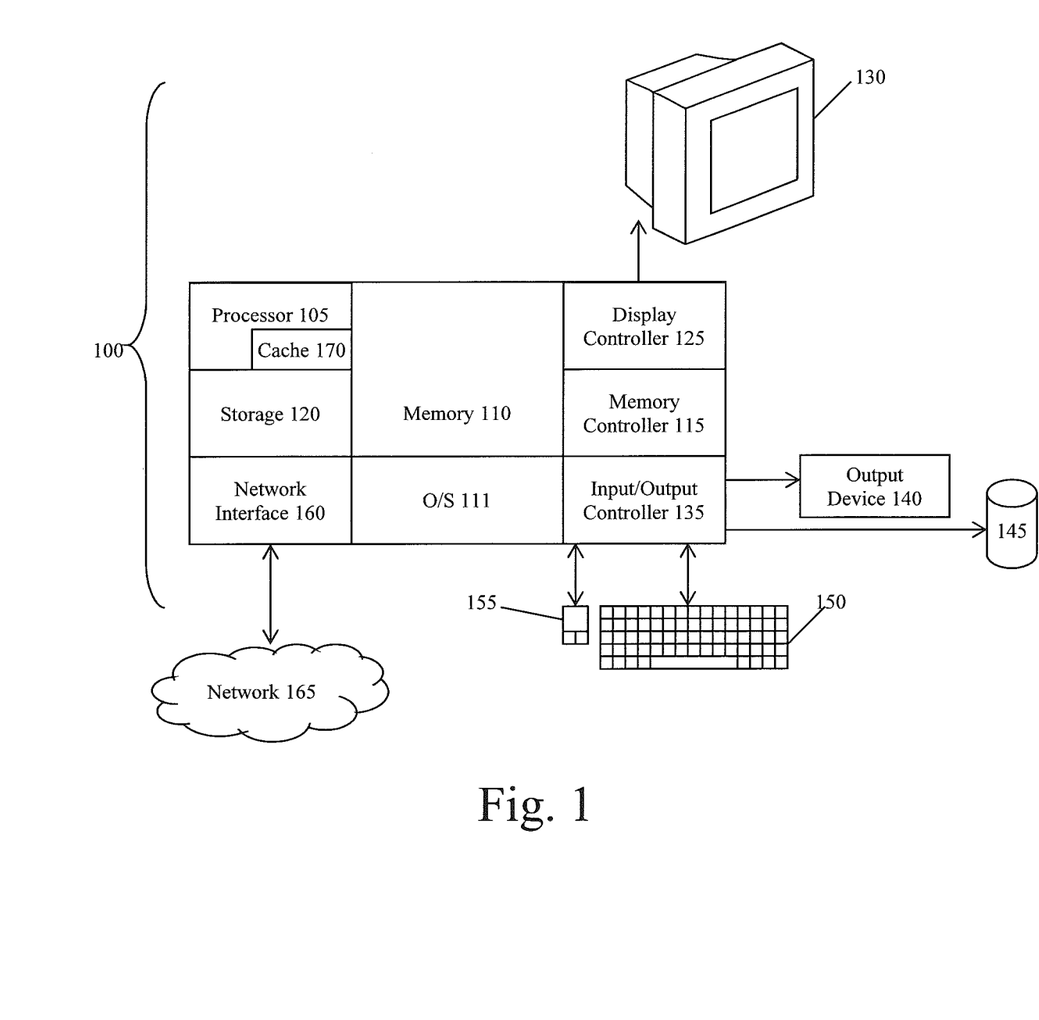
FIG. 1 is a block diagram of a computing device useable with a system according to an embodiment.

FIG. 1 illustrates a block diagram of a computer system 100 for use in implementing control block management according to some embodiments. The control block management described herein may be implemented in hardware, software (e.g., firmware), or a combination thereof. In an exemplary embodiment, the methods described are implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer system 100 includes a processor 105, memory 110 coupled to a memory controller 115, and one or more input and/or output (I/O) devices 140 and 145, such as peripherals, that are communicatively coupled via a local I/O controller 135. The I/O controller 135 may be, for example but not limitation, one or more buses or other wired or wireless connections, as are known in the art. The I/O controller 135 may have additional elements, which are omitted for simplicity, such as controllers, buffers (caches), drivers, repeaters, and receivers, to enable communications.

The processor 105 is a hardware device for executing hardware instructions or software, particularly those stored in memory 110. The processor 105 may be any custom made or commercially available processor, a central processing unit (CPU), an auxiliary processor among several processors associated with the computer system 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive.

In an exemplary embodiment, a conventional keyboard 150 and mouse 155 may be coupled to the I/O controller 135. Other output devices such as the I/O devices 140 and 145 may include input devices, for example but not limited to, a printer, a scanner, a microphone, and the like. The I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

The computer system 100 may further include a display controller 125 coupled to a display 130. In an exemplary embodiment, the computer system 100 may further include a network interface 160 for coupling to a network 165. The network 165 may be an IP-based network for communication between the computer system 100 and any external server, client and the like via a broadband connection. The network 165 transmits and receives data between the computer system 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 2:
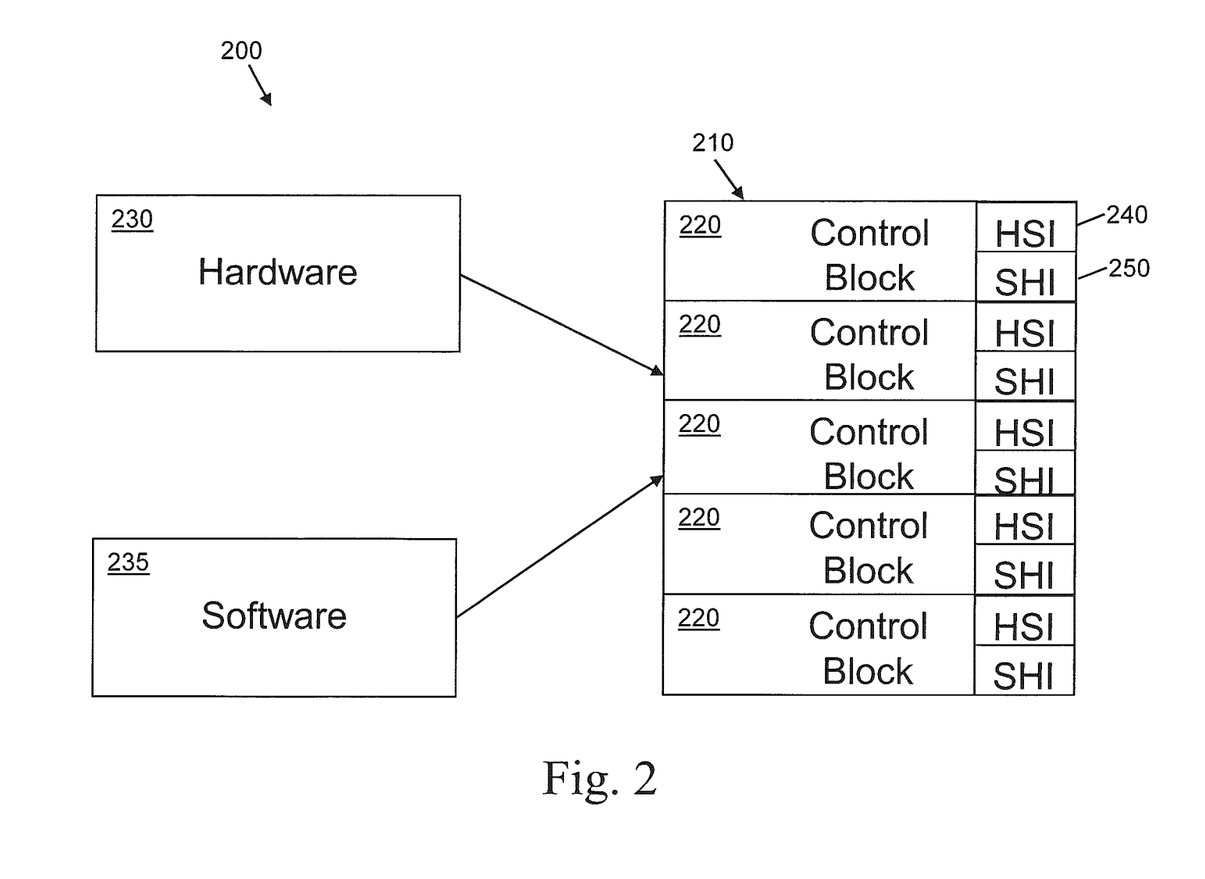
FIG. 2 is a block diagram of a system according to an embodiment.

FIG. 2 illustrates a control block management system 200 according to some embodiments of this disclosure. The system 200 may be embodied, in whole or in part, in one or more computer systems 100, such as the computer system 100 shown in FIG. 1.

As shown in FIG. 2, the system 200 may include, or operate in conjunction with, a queue 210, one or more control blocks 220 in the queue 210, and a hardware device 230 for executing the control blocks 220 in the queue 210. The queue 210 may be thought of as a work queue with each control block 220 being a work event ordered by software 235 that is in communication with the queue 210. The control blocks 220 may be stored in contiguous host memory, thus forming the queue 210. A hardware I/O device 230 may operate on the queue 210 by addressing each control block 220 in turn.

Each control block 220 may include a hardware-to-software interlock (HSI) 240 and a software-to-hardware interlock (SHI) 250. Together, the HSI 240 and the SHI 250 may be used to pass information between the hardware 230 and software 235, which traditionally are unable to communicate with each other directly in real-time. Because of this inability, it is conventionally challenging for the software 235 to communicate to the hardware 230 that a control block 220 needs to be removed from the queue 210. The HSI 240 and the SHI 205 may alleviate this problem. The HSI 240 may include a set of flags to be set by the hardware 230, while the SHI 250 may include a set of flags to be set by the software 235. In an exemplary embodiment, the HSI 240 and the SHI 250 may form a byte of storage apiece within a control block 220, totaling two bytes of storage together. It will be understood, however, that this amount of storage may vary based on implementation.

Figure 3:
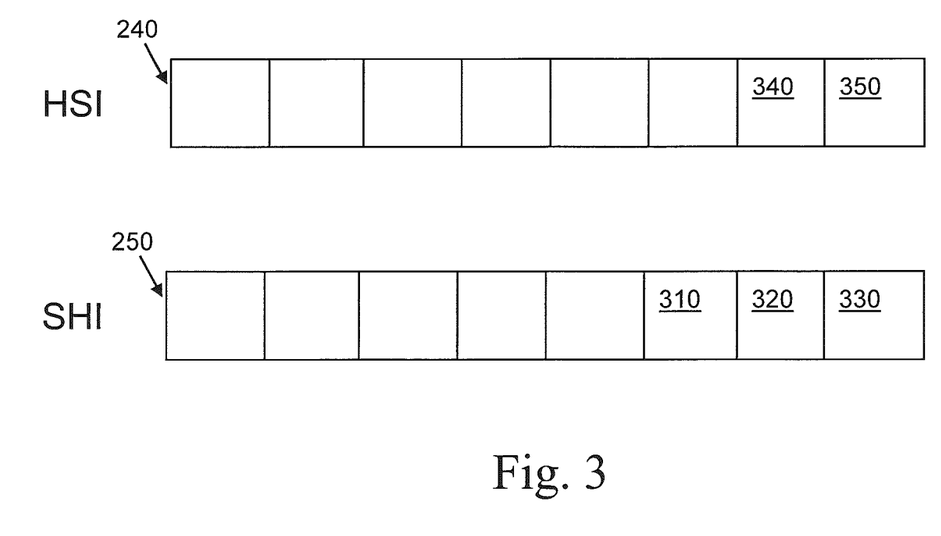
FIG. 3 is a block diagram of a software-to-hardware interlock and a hardware-to-software interlock of a control block, according to an embodiment.

FIG. 3 is a block diagram of an exemplary HSI 240 and SHI 250. Each of the HSI 240 and the SHI 250 may contain state information in the form of its flags. As shown, the SHI 250 may include an interrupt flag 310, which may be used according to conventional interrupt methods, as well as a purge flag 320 and a next flag 330. The HSI 240 may include a fetched flag 340 and a completed flag 350.

According to some embodiments, control blocks 220 may be prefetched and stored in local memory of the hardware I/O device 230 before being executed. The hardware 230 may set the fetched flag 340 of a control block's HSI 240 after the control block 220 has been prefetched. The hardware 230 may later set the completed flag 350 after the control block 220 has been executed.

The software 235 may set the interrupt flag 310 of the SHI 250 to indicate that the hardware 230 should send an interrupt upon completion of processing the control block 220. Upon reading such flag, the hardware 230 may send the requested interrupt when execution of the corresponding control block 220 is finished. The software 235 may set the purge flag 320 to indicate that a control block 220 is to be removed from the queue 210 before being executed. The software 235 may be unable to set the interrupt flag 310 or the purge flag 320 after the fetched flag 340 is set. Accordingly, execution may proceed and no purge may be allowed for a prefetched control block 220.

The software 235 may set the next flag 330 of a control block 220 to indicate that the subsequent control block in the queue 210 is valid. Thus, if the hardware 230 sees the next flag 330, it may begin processing the following control block 220 automatically after finishing with the current one. The software 235 may be unable to set the next flag 330 of a control block 220 after the completed flag 350 is set. This is because existence of the completed flag 305 would indicate that the hardware device 230 is finished with that control block 220 and may have already conducted its final check of the SHI flags, which may occur directly after setting the completed flag 350.

The software 235 may be required to check the HSI 240 flags to determine how to proceed before setting a flag of its own, such as setting the purge flag 320 to indicate that a control block 220 should be purged. When setting a flag of the SHI 240, the software 235 may do so using an atomic operation to first check the HSI flags and then conditionally set the desired SHI flag, thus synchronizing the processing order with the hardware and avoiding any conflict that may arise by the hardware 230 potentially performing tasks on a control block 220 while the software 235 is setting that control block's flags.

Figure 4:
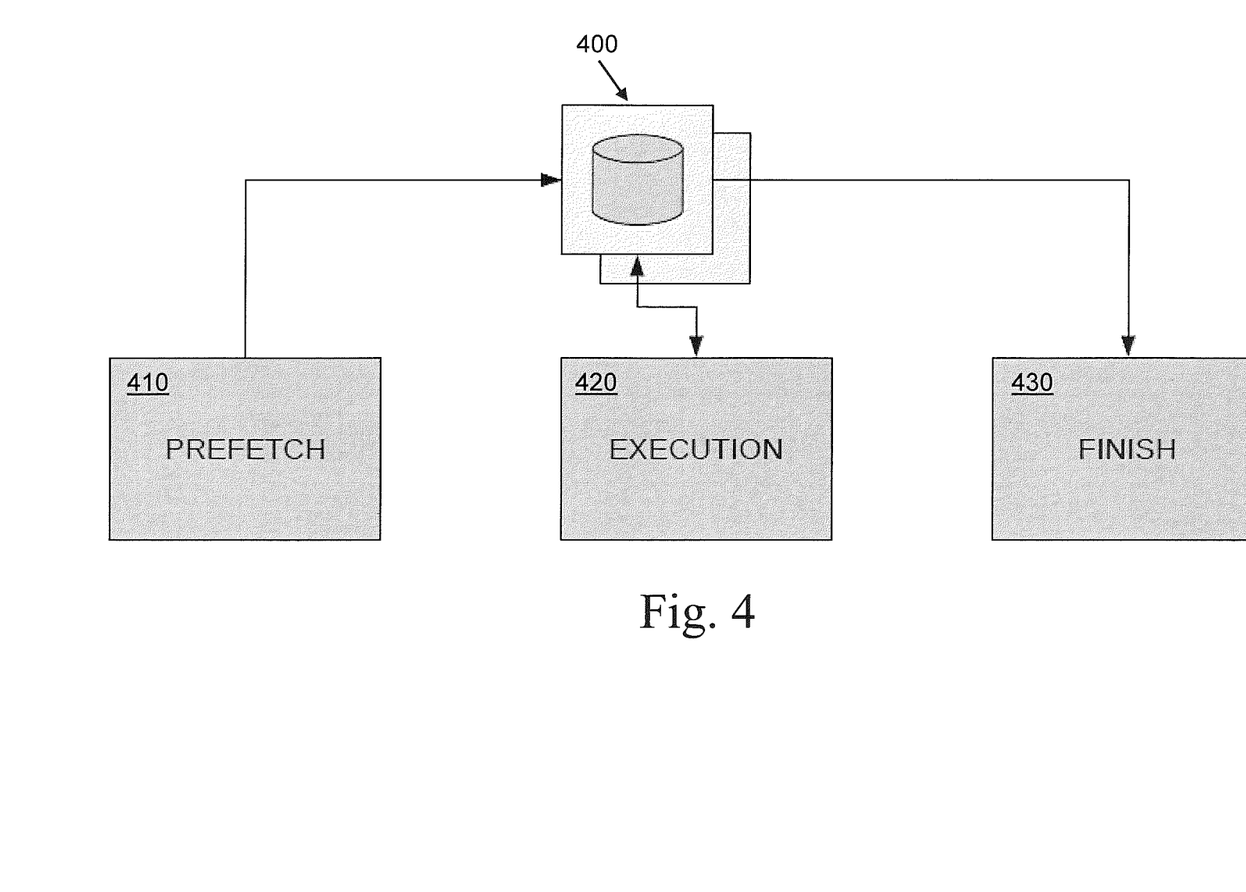
FIG. 4 is a block diagram of an execution pipeline according to an embodiment.

FIG. 4 illustrates an execution pipeline 400 for a hardware device 230, according to some embodiments of this disclosure. The hardware device 230 may be able to see and act on multiple control blocks 220 at a time, using the pipeline 400, where each component of the hardware device's pipeline 400 may operate on a distinct control block 220. Further, using the pipeline 400, the hardware device 230 may maintain the order of the queue 210 while handling multiple control blocks 220 at a time.

As shown, the pipeline 400 may include a prefetcher 410, an execution engine 420, and a finisher 430. The prefetcher 410, the execution engine 420, and the finisher 430 may step through the control blocks 220 of the queue 210. The prefetcher 410 may prefetch a control block 220 and store it in the hardware's local memory. The prefetcher 410 may then set the fetched flag 340 of the control block 220. If the next flag 330 of the control block 220 is valid, the prefetcher 410 may re-invoke itself and move forward to the subsequent control block 220 in the queue 210. The execution engine 420 may execute the control block 220 that was previously prefetched. The finisher 430 may follow the execution engine 420 and set the completed flag 350 of the control block 220.

Unlike the software 235, the hardware 230 need not perform atomic operations. Rather, the prefetcher 410, the execution engine 420, and the finisher 430 may each check the SHI 250 and the HSI 240 before and after performing tasks on a control block 220. Before a control block 220 is prefetched, as indicated by the fetched flag 340 set in the HSI 240, software 235 may set the purge flag 320 to indicate that the control block 220 is to be purged. This may occur by atomically setting the purge flag 320 while checking the fetched flag 340. When the prefetcher 410 reaches that control block 220, it may first check the SHI 250 and read the purge flag 320. If the purge flag is not set, the prefetcher 410 may set the fetched flag 340 and write the HSI 340 to memory and then re-read the SHI 250. If, however, the original or this secondary observation of the SHI 250 reveals that the purge flag 320 is set, the prefetcher 410 may set the fetched flag 340 and the completed flag 350. In an exemplary embodiment, this control block 220 will thus not be executed. If the next flag 330 is observed as valid on the original or secondary read of the SHI 250, the subsequent control block 220 in the queue 210 may be retrieved by the prefetcher 410, and this process may repeat for that control block 220.

Accordingly, when the execution engine 420 completes execution of a control block 220 that does not have the purge flag 320 set, the finisher 430 may then set the complete flag 350 and write the HSI 240 to memory. Additionally, if the next flag 330 is not set, the finisher 430 may re-read the SHI 250. If the next flag 330 is still not set, execution on this queue 210 may end. Otherwise, the prefetcher 410 may retrieve the subsequent control block 220, and the process may repeat on that control block 220.

Figure 5A:
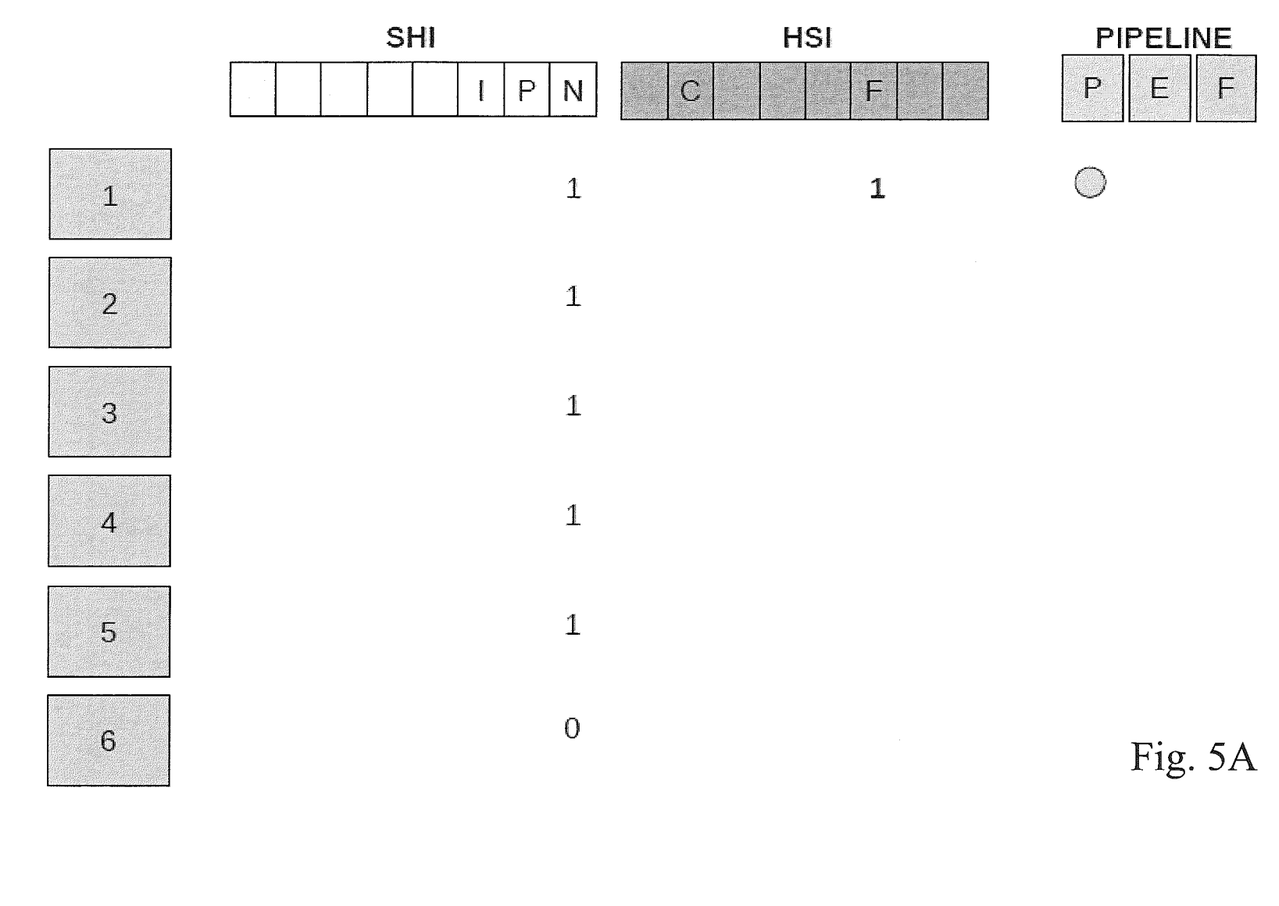
FIGS. 5A-5E illustrate execution of a set of control blocks according to an embodiment.

FIGS. 5A-5E illustrate how an exemplary embodiment of this disclosure may behave when handling the purge flag 320 of the SHI 240. In FIG. 5A, six control blocks 220 are present in a queue 210. It will be understood that this quantity of control blocks 220 is provided for illustrative purposes only. It will be further understood that the order of operations illustrated in this series of figures need not occur exactly as shown and some variation may occur dependent on implementation, execution speed, or other factors.

In FIG. 5A, each control block 220 shown except the last has its next flag 330 set, indicating that the following control block 220 is valid and should be processed by the hardware 230. As shown, the prefetcher 410 fetches the first control block 220. After the fetch is performed, the prefetcher 410 sets the fetched flag 340 of the first control block 220.

Figure 5B:
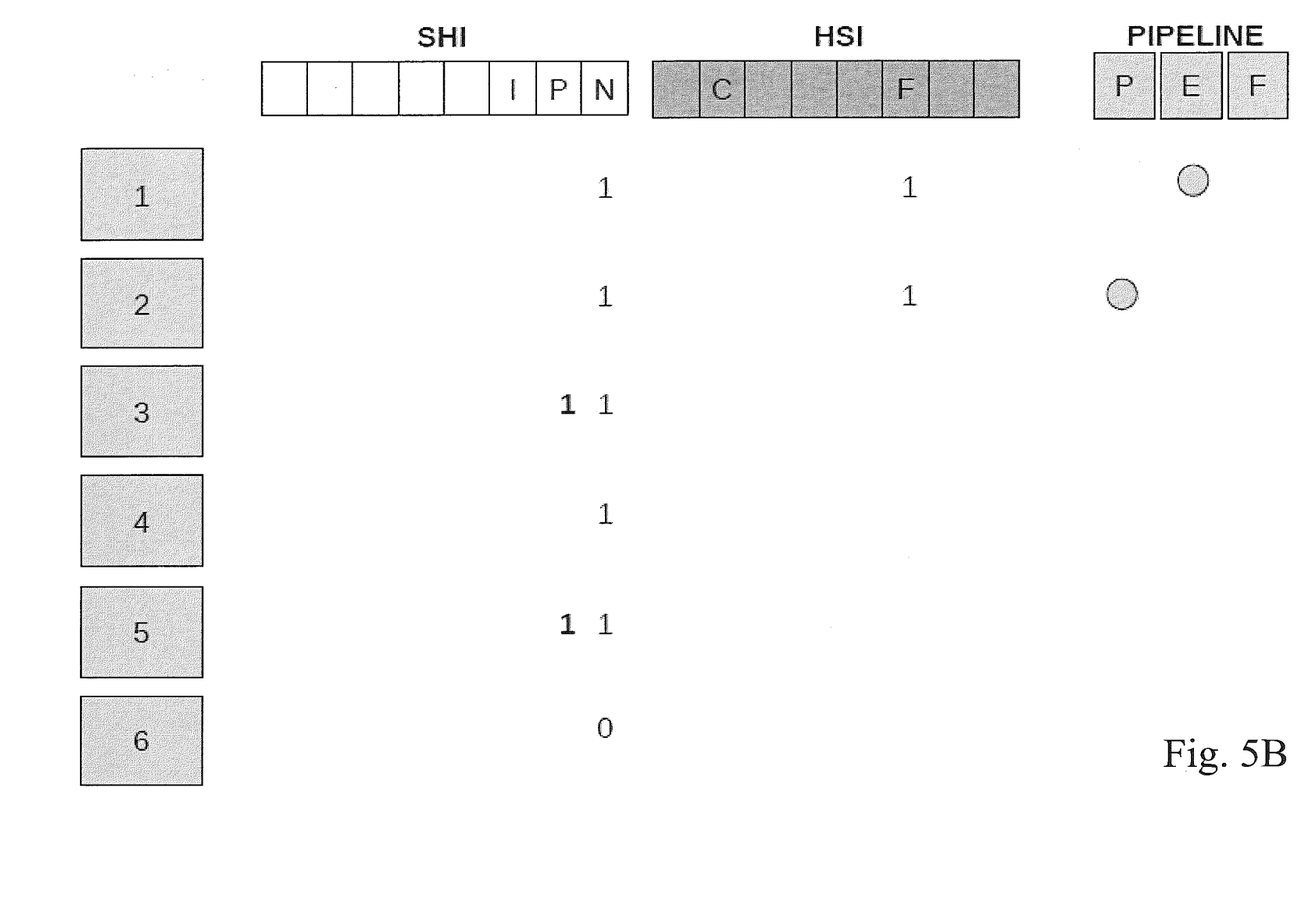

In FIG. 5B, the prefetcher 410 has moved on to the second control block 220, and the execution engine 420 begins executing the first control block 220. The prefetcher 410 fetches the second control block 220 and sets the corresponding fetched flag 340. Additionally, the software 235 determines that the third and fifth control blocks 220 should be purged. After checking the HSI 240 to confirm that these control blocks 220 have not yet been fetched, the software 235 sets the purge flag 320 in each of these control blocks 220. Use of atomic operations to set the purge flags 330 prevents the hardware 230 from operating on these control blocks 220 while the purge flags 330 are being set.

Figure 5C:
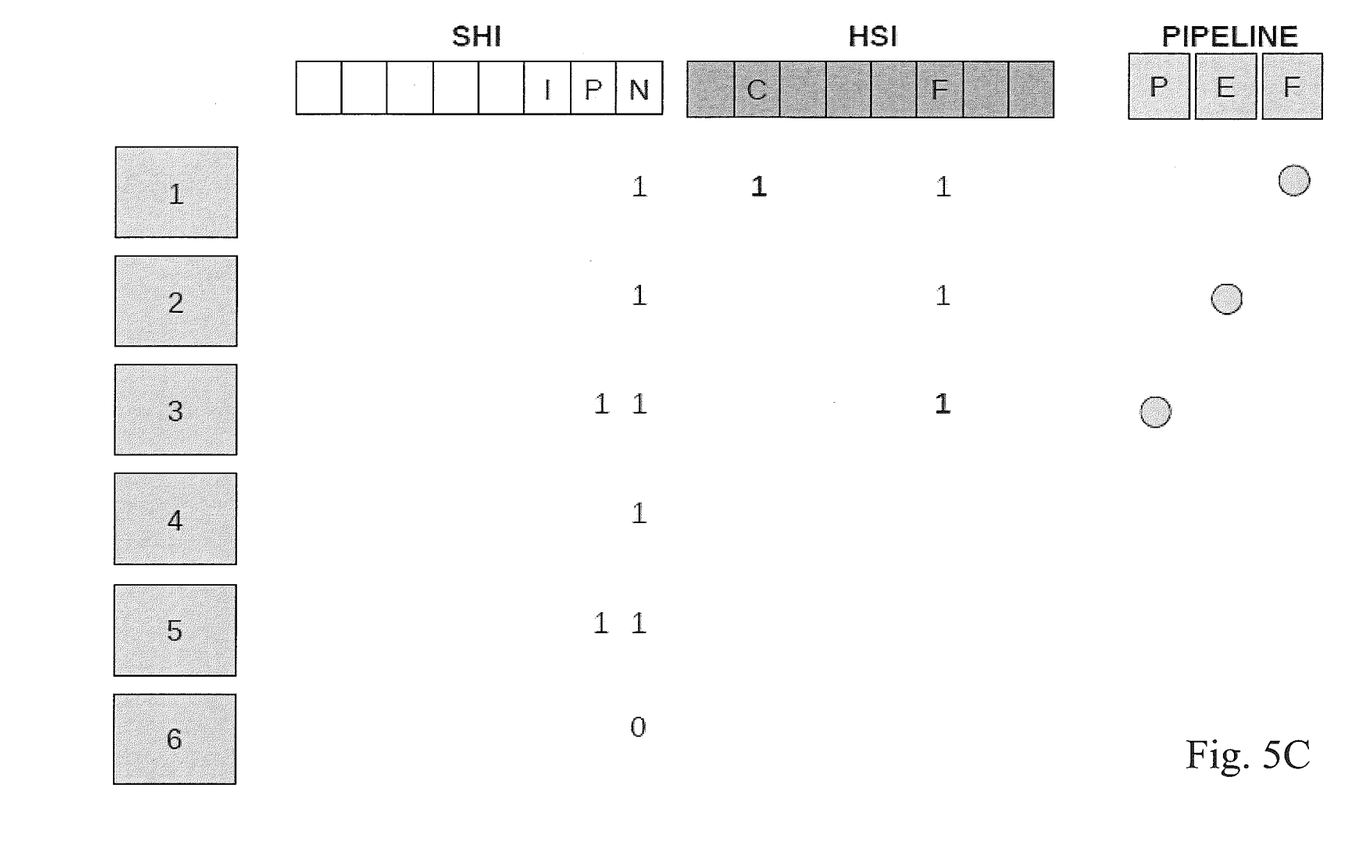

In FIG. 5C, the prefetcher 410 reaches the third control block 220 and checks the SHI 250 before performing its work. In this case, the prefetcher 410 finds that the purge flag 320 of the third control block 220 is set. Thus, the prefetcher 410 marks that control block 220 as fetched and notes that the next flag 330 is on. Also in FIG. 5C, the execution engine 420 executes the second control block 220, and the finisher 430 sets the completed flag 350 of the first control block 220.

Figure 5D:
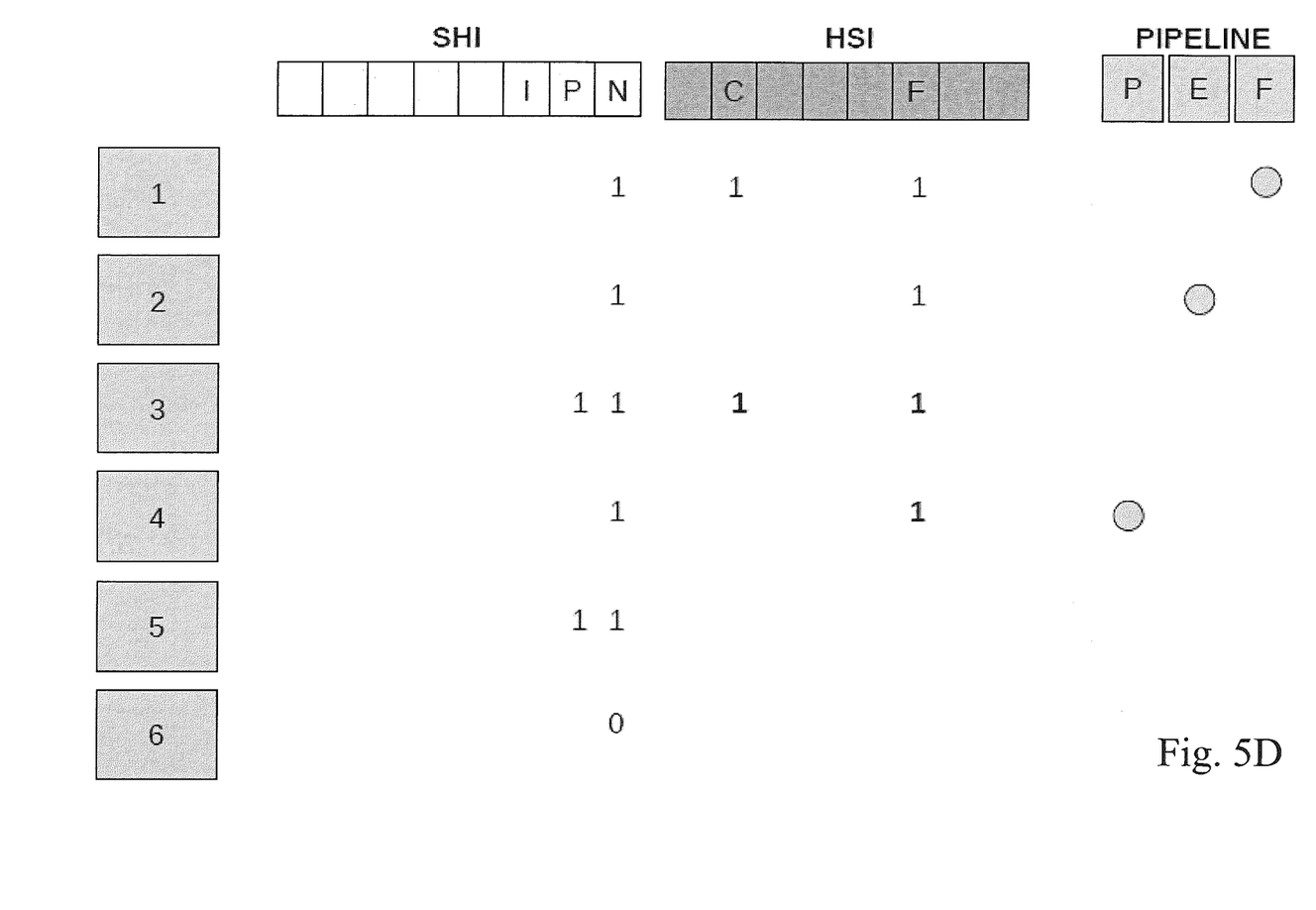

In FIG. 5D, as shown, the completed flag 350 of the third control block 220 is set. This flag 350 may have been set by the prefetcher 420 before moving forward to the fourth control block 220, after having noted the next flag 330 already. Thus, when addressing the third control block, the prefetcher 410 set both the fetched flag 340 and the completed flag 350. Accordingly, when the execution engine 420 and the finisher 430 reach the third control block 220, they may skip over it after checking the HSI 240 and seeing that the completed flag 350 is set.

Figure 5E:
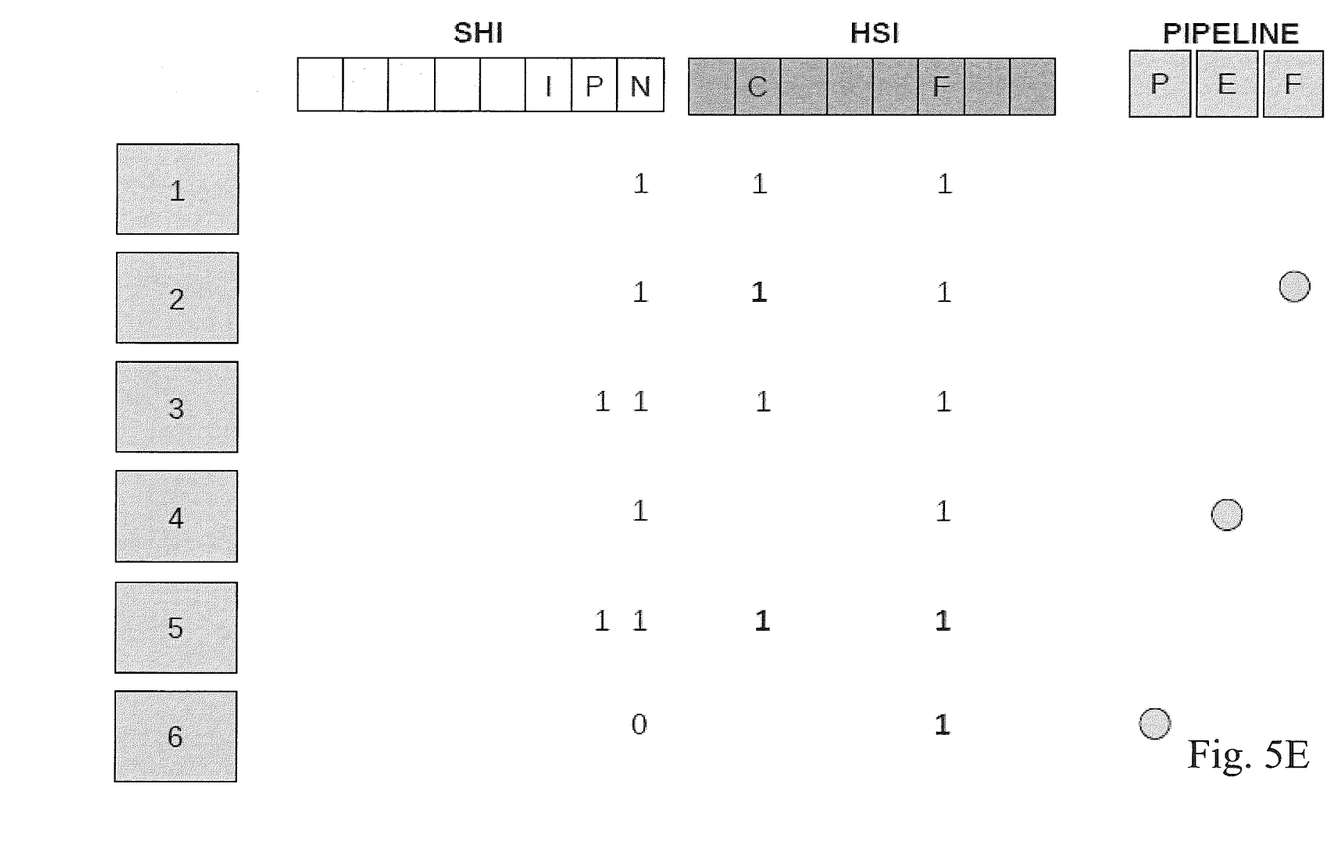

In FIG. 5E, the prefetcher has set the fetched flag 340 and the completed flag 350 of the fifth control block 220, for which the purge flag 320 was set. The execution engine 420 is executing the fourth control block 220, having skipped the third control block 220, which was marked as complete by the prefetcher 410. The finisher 430 sets the completed flag 350 of the second control block 220, which was previously executed by the execution engine 420.

As illustrated in the above example, certain control blocks may be skipped by the execution engine 420 when the purge flag 320 is set. These control blocks 220 are effectively removed from execution queue and are not executed.

Figure 6:
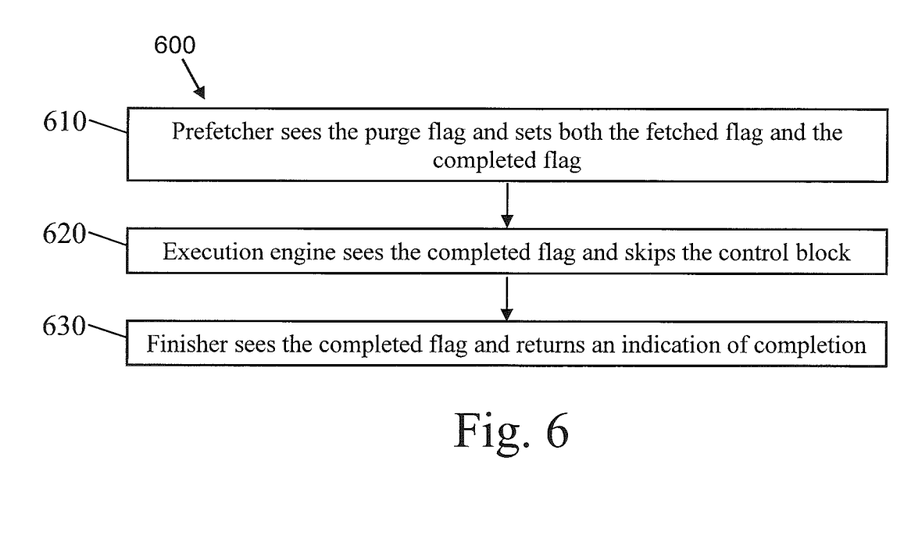
FIG. 6 is a flow diagram of a method for handling a control block having a purge flag, according to an embodiment.

FIG. 6 is a flow diagram of an exemplary method 600 used by the hardware 230 for handling a control block 220 with a set purge flag 320. As shown, at block 610, the prefetcher 410 may check the SHI 250 of the control block 220. When the prefetcher 410 finds that the purge flag 320 is set, the prefetcher 410 may set both the fetched flag 340 and the completed flag 350 of the HSI 240. At block 620, when the execution engine 420 reaches the control block 220, it sees that the completed flag 350 is set. Thus, the execution engine 420 may skip the control block 220. At block 630, when the finisher 430 reaches the control block 220, the finisher 430 sees that the completed flag 350 is set. Thus, the finisher 430 may return an indication that the control block 220 has been processed by the hardware 230. Accordingly, execution of the control block 220 was skipped without taking the queue 210 holding the control block 220 offline.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    placing one or more control blocks in a queue for execution by a computer hardware device; and
    allocating a purge flag in each of the control blocks, wherein the purge flag instructs the computer hardware device to skip execution of the corresponding control block.

2. The method of claim 1, further comprising:
    allocating, in a first control block of the one or more control blocks, a fetched flag configurable by the computer hardware device to indicate when the first control block has been prefetched; and
    setting the purge flag of the first control block after confirming that the fetched flag is not set.

3. The method of claim 2, further comprising confirming the fetched flag is not set and setting the purge bit together as an atomic operation.

4. The method of claim 2, wherein the computer hardware device is configured to skip execution of the first control block upon reading the set purge flag.

5. The method of claim 4, wherein the computer hardware device is configured to prefetch a second control block, ordered after the first control block in the queue, after skipping the execution of the first control block.

6. The method of claim 1, wherein the computer hardware device is configured to maintain an order of the queue and to continue executing the queue, while skipping execution of the control blocks for which the purge flag is set.

7. The method of claim 1, further comprising:
    allocating a software-to-hardware interlock for each of the control blocks, the purge flag being part of the software-to-hardware interlock;
    allocating a hardware-to-software interlock for each of the control blocks; and
    reading the hardware-to-software interlock of a first control block, from among the one or more control blocks, before setting the purge flag of the software-to-hardware interlock of the first control block.

8. A control block management system comprising:
    a queue having one or more control blocks for execution by a computer hardware device;
    a first control block in the queue; and
    a computer processor communicatively coupled to the queue, the computer processor configured to allocate a purge flag in the first control block, the purge flag configured to instruct a computer hardware device to skip execution of the first control block.

9. The system of claim 8, the first control block further comprising a fetched flag configurable by the computer hardware device to indicate whether the first control block has been prefetched, wherein the system further comprises a software application configured to set the purge flag of the first control block after confirming that the fetched flag is not set.

10. The system of claim 9, the software application being configured to confirm that the fetched flag is not set and to set the purge flag together in an atomic operation.

11. The system of claim 9, wherein the computer hardware device is configured to skip execution of the first control block upon reading the set purge flag.

12. The system of claim 11, wherein the computer hardware device is configured to prefetch a second control block, ordered after the first control block in the queue, after skipping the execution of the first control block.

13. The system of claim 8, wherein the computer hardware device is configured to maintain an order of the queue and to continue executing the queue, while skipping execution of the control blocks for which the purge flag is set.

14. The system of claim 8, the first control block further comprising:
    a software-to-hardware interlock, the purge flag being part of the software-to-hardware interlock; and
    a hardware-to-software interlock;
    wherein the system further comprises a software application configured to read the hardware-to-software interlock of the first control block before setting the purge flag of the software-to-hardware interlock of the first control block.

15. A computer program product comprising a computer readable storage medium having program code embodied therewith, the program code executable by a processor to perform a method comprising:
    placing one or more control blocks in a queue for execution by a computer hardware device; and
    allocating a purge flag in each of the control blocks, wherein the purge flag instructs the computer hardware device to skip execution of the corresponding control block.

16. The computer program product of claim 15, the method further comprising:
    allocating, in a first control block of the one or more control blocks, a fetched flag configurable by the computer hardware device to indicate whether the first control block has been prefetched; and
    setting the purge flag of the first control block after confirming that the fetched flag is not set.

17. The computer program product of claim 16, the method further comprising confirming the fetched flag is not set and setting the purge bit together as an atomic operation.

18. The computer program product of claim 16, wherein the computer hardware device is configured to skip execution of the first control block upon reading the set purge flag.

19. The computer program product of claim 15, wherein the computer hardware device is configured to maintain an order of the queue and to continue executing the queue, while skipping execution of the control blocks for which the purge flag is set.

20. The computer program product of claim 15, the method further comprising:
    allocating a software-to-hardware interlock for each of the control blocks, the purge flag being part of the software-to-hardware interlock;
    allocating a hardware-to-software interlock for each of the control blocks; and
    reading the hardware-to-software interlock of a first control block, from among the one or more control blocks, before setting the purge flag of the software-to-hardware interlock of the first control block.

* * * * *